United States Patent Office 3,655,797
Patented Apr. 11, 1972

3,655,797
ALKYLATION PROCESS
Louis Schmerling, Riverside, Ill., assignor to Universal Oil Products Company, Des Plaines, Ill.
No Drawing. Filed Sept. 24, 1970, Ser. No. 75,030
Int. Cl. C07c 3/56
U.S. Cl. 260—671
12 Claims

ABSTRACT OF THE DISCLOSURE

Improved yields of alkylated aromatic hydrocarbons are obtained when an aromatic hydrocarbon is reacted with a saturated hydrocarbon in the presence of a catalyst comprising a Friedel-Crafts metal halide mixed with a higher valence halide of a metal which forms at least two metal halides and in the presence of an excess amount of an oxygen-containing gas.

---

This invention relates to a process for the alkylation of an aromatic hydrocarbon. More particularly, the invention is concerned with an improvement in the process of alkylating an aromatic hydrocarbon utilizing a saturated hydrocarbon as the alkylating agent, said improvement resulting in the obtention of higher yields of the desired product.

Alkylated aromatic compounds are widely used in the chemical industry. For example t-butylbenzene may be used as an intermediate, if so desired, in the preparation of compounds which are useful as oxidative inhibitors. Another useful chemical comprises dodecylbenzene which is useful as an intermediate in the presence of detergents of the alkyl aryl sulfonate type.

It is therefore an object of this invention to provide an improvement process for the alkylation of alkylable aromatic compounds.

A further object of this invention is to provide an improvement in the process for the alkylation of aromatic hydrocarbons whereby greater yields of the desired product are obtained.

In one aspect an embodiment of this invention relates to a process for the alkylation of an aromatic compound which comprises reacting said compound with a saturated hydrocarbon at alkylation conditions in the presence of an excess amount of an oxygen-containing gas and a catalyst consisting of a Friedel-Crafts metal halide and a higher valence halide of a metal capable of possessing at least two valences, and recovering the resultant alkylated aromatic compound.

A specific embodiment of this invention is found in a process for the alkylation of an aromatic compound which comprises reacting benzene with isopentane at a temperature in the range of from about 0° to about 300° C. and a pressure in the range of from about atmospheric to about 200 atmospheres, in the presence of an excess amount of air and a catalyst consisting of a mixture of aluminum chloride and cupric chloride, and recovering the resultant amylbenzenes.

Other objects and embodiments will be found in the following further detailed description of the present invention.

As hereinbefore set forth the present invention is concerned with an improvement of an alkylation process whereby greater yields of the desired alkylated aromatic compounds may be obtained. As will be hereinafter shown in greater detail, the yields of desired products are unexpectedly improved, the yield of the desired products being doubled in many instances, by the presence of an excess amount of an oxygen-containing gas in the reaction mixture. Suitable aromatic hydrocarbons which may be alkylated according to the process of this invention will include unsubstituted and substituted aromatic hydrocarbons such as, for example, benzene, toluene, o-xylene, m-xylene, p-xylene, ethylbenzene, propylbenzene, isopropylbenzene, (cumene), o-ethyltoluene, m-ethyltoluene, p-ethyltoluene, 1,2,3 - trimethylbenzene (hemimellitene), 1,2,4 - trimethylbenzene (pseudocumene), 1,2,3 - trimethylbenzene (mesitylene), diethylbenzene, triethylbenzene, propyltoluenes, naphthalene, 1 - methylnaphthalene, 2 - methylnaphthalene, 1,2 - dimethylnaphthalene, 1,2,3 - trimethylnaphthalene, 1 - ethylnaphthalene, 2 - ethylnaphthalene, 1,2-diethylnaphthalene, the corresponding unsubstituted and substituted anthracenes, phenanthrenes, chrysenes, etc. It is also contemplated within the scope of this invention that higher molecular weight alkylaromatic hydrocarbons may be also subjected to alkylation, said alkylaromatic hydrocarbons including those which are produced by the alkylation of aromatic hydrocarbons with olefins and polymers such as hexylbenzenes, nonylbenzenes, dodecylbenzenes, pentadecylbenzenes, hexyltoluenes, nonyltoluenes, etc. Other suitable aromatic hydrocarbons, which at specific conditions depending upon the melting point of the aromatic chosen would be in liquid form and would include those aromatic hydrocarbons with two or more aryl groups in a non-condensed configuration such as biphenyl, diphenylmethane, triphenyl, triphenylmethane, fluorine, stilbene, etc., may also be used. Of the aforementioned aromatic hydrocarbons that may be utilized in the process of this invention, the benzene hydrocarbons are preferred, and of the preferred benzene hydrocarbons, benzene itself is particularly preferred.

The saturated hydrocarbons which are utilized as the alkylating agent may be selected from the acyclic and cycloparaffinic hydrocarbons, the preferred alkanes and cycloalkanes being those which contain tertiary carbon atoms. Some specific examples of these suitable saturated hydrocarbons include hydrocarbons containing from 3 to about 10 carbon atoms or more such as propane, n-butane, isobutane, n-pentane, isopentane, hexanes, methylpentanes, heptanes, dimethylbutanes, octanes, nonanes, decanes, etc.; cyclopentane, methylcyclopentane, dimethylcyclopentanes, diethylcyclopentanes, cyclohexane, methylcyclohexane, dimethylcyclohexanes, ethylcyclohexane, diethylcyclohexanes, cycloheptanes, etc.

The catalyst which is utilized to effect the alkylation of the aromatic hydrocarbon with the saturated hydrocarbons possesses a high degree of hydrocarbon conversion activity and is particularly effective as an alkylation catalyst for the alkylable aromatic hydrocarbons. This catalyst consists of a mixture of a Friedel-Crafts metal halide with a higher valence halide of a metal which is capable of existing in at least 2 valences. Friedel-Crafts metal halides which may be used will include aluminum chloride, aluminum bromide, zinc chloride, boron trifluoride, etc. Although boron is a metalloid, for purposes of this invention it is included within the term "metal halide." Suitable metals which are capable of existing in at least two different valence states include copper, mercury, iron, tin, lead, cobalt, molybdenum, chromium and manganese. The various bromides and chlorides of the above metals such as mercuric chloride, mercuric bromide, cupric chloride, cupric bromide, manganese perchloride, molybdenum trichloride, molybdenum tetrachloride and pentachloride, molybdenum tribromide, molybdenum tetrabromide, molybdenum pentabromide, chromic chloride, chromic bromide, manganese trichloride, manganese tribromide, ferric chloride, ferric bromide, cobaltic chloride, cobaltic bromide, stannic chloride, stannic bromide, lead tetrachloride, etc., are thus utilizable as a component of the catalyst. The usually preferred catalysts which are utilized in this reaction comprise a mixture of aluminum chloride and cupric chloride or zinc chloride and cupric chloride. The aluminum chloride or zinc chloride may be used in a catalytic amount, or preferably in equimolar amounts with the cupric chloride, the halides being added to the reaction mixture separately or as a previously admixed complex. It is also contemplated within the scope of this invention that hydrogen chloride may be added to the reaction mixture along with, as hereinafter set forth in greater detail, an excess amount of an oxygen-containing gas. As previously mentioned, the preferred catalysts comprise a mixture of aluminum chloride and cupric chloride or zinc chloride and cupric chloride. One advantage of utilizing a zinc chloride-cupric chloride catalyst system is that the formation of water which occurs when utilizing hydrogen chloride and an excess amount of an oxygen-containing gas will not have a deleterious effect upon the Friedel-Crafts catalytic activity of the zinc chloride. This is in contradistinction to the effect of water upon aluminum chloride which tends to lose its activity when contacted with water.

The alkylation conditions under which the reaction of this invention is effected in lower temperatures ranging from 0° to about 300° C. and a pressure in the range of from about atmospheric to about 200 atmospheres or more, the particular temperature and pressure which is utilized being dependent upon the reactants as well as the catalyst system. In addition, the reaction is effected in the presence of an excess amount of an oxygen-containing gas such as air or oxygen, the former being preferred due to the lower cost which is attendant upon its use. The oxygen-containing gas will be used in the reaction mixture in an amount of at least 1:1 mols of oxygen per mol of metal halide capable of existing in at least 2 valences and preferably in a range of from about 1.5:1 up to about 5:1 mols of oxygen per mol of the higher valence metal halide.

The process of this invention whereby improved yields of alkylated aromatic hydrocarbons are obtained by effecting the alkylation process in the presence of an excess amount of an oxygen-containing gas may be effected in any suitable manner and may comprise a batch or continuous type of operation. When a batch type operation is used, a quantity of the aromatic hydrocarbon and the saturated hydrocarbon are sealed in an appropriate apparatus such as, for example, an autoclave of the rotating or stirred variety. In addition, the particular catalyst system comprising a mixture of a Friedel-Crafts metal halide and a higher valence halide of a metal capable of existing in at least 2 valences is also placed in the autoclave. Following this, an oxygen-containing gas such as air is then pressured into the autoclave until the desired operating pressure is attained. In an alternative manner, it is also contemplated that the oxygen-containing gas may account for only a partial pressure of the desired operating pressure, the remainder being afforded by the introduction of a substantially inert gas such as nitrogen into the reactor. Following this, the autoclave is then maintained at a predetermined operating temperature which, as hereinbefore set forth, may range from about 0° to about 300° C. the subatmospheric temperatures being maintained by the use of an ice bath, ambient temperature being maintained by the use of a water bath and elevated temperatures being maintained by conventional heating means. After completion of the predetermined residence time which may range from 0.5 up to about 10 hours or more in duration, the autoclave is allowed to return to room temperature if the reaction is effected at subatmospheric or elevated temperatures. The excess pressure is discharged and the autoclave is opened. The reaction mixture is recovered and subjected to conventional means of purification, separation and recovery, said means including hydrolyzation, filtration, washing, drying, distillation, etc., whereby the desired alkylated aromatic hydrocarbon is separated and recovered.

It is also contemplated within the scope of this invention that the process may be effected in a continuous manner of operation. One particular type of operation which may be employed is to continuously charge the reactants comprising the alkylable aromatic hydrocarbon and the saturated hydrocarbon to the reaction zone which contains the desired catalyst system, said reaction zone being maintained at the proper operating conditions of pressure and temperature. In addition, the oxygen-containing gas is also continuously charged thereto in an amount sufficient to maintain an excess of said oxygen-containing gas in the reaction zone. If so desired, the two reactants may be charged through separate lines or they may be admixed prior to entry into said reaction zone and charged thereto in a single stream. Inasmuch as the catalyst system is in solid form, the reactants may be charged to the reaction zone containing the catalyst in either an upward, downward or radial flow over a fixed bed of the catalyst and thereafter the alkylated product may be continuously withdrawn and separated from the reactor effluent and recovered while any unreacted starting materials may be recycled to form a portion of the feed stock. Yet another continuous method of operation comprises a moving bed type in which the reactants and the catalyst are passed through said reactor zone either concurrently or counter-currently to each other. In addition another type of operation which may be employed constitutes a slurry type in which the catalyst is carried into the reaction zone in one or both of the reactors.

As will be hereinafter shown in greater detail, the use of an excess amount of an oxygen-containing gas in the reaction zone will result in a totally unexpected improvement in the amount of the alkylated aromatic hydrocarbon which is formed by the reaction of an alkylable aromatic hydrocarbon with a saturated hydrocarbon in the presence of a catalyst system which is utilized.

The following examples are given to illustrate the process of the present invention which, however, are not intended to limit the generally broad scope of the present invention in strict accordance therewith.

EXAMPLE I

In this example 0.5 mol of benzene, 0.3 mol of isopentane along with a catalyst consisting of an equimolar mixture of aluminum chloride and cupric chloride was placed in an Erlenmeyer flask equipped with a Dry-Ice condenser. The temperature was maintained in a range of from 18° to 23° C. for a period of 2 hours. At the end of this time, the reaction mixture was recovered and after treatment by hydrolysis, filtration, washing, drying, and distillation, the desired product, comprising a 28 mol percent yield (based on the cupric chloride) of mixed amylbenzenes was recovered.

EXAMPLE II

To illustrate the unexpected result which was obtained when utilizing an excess amount of an oxygen-containing gas, the above example was repeated using the same amounts of reactants and catalyst, but a mixture of anhydrous hydrogen chloride and air was bubbled through the contents of the Erlenmeyer flask which were kept at 13°–17° C. After work-up in the usual manner, the product was found to comprise almost double the yield of amylbenzene as were obtained in Example I, namely 41 mol percent.

EXAMPLE III

A mixture of 2.5 mols of benzene, 1.0 mol of isopentane, and 0.5 mol each of cupric chloride and aluminum chloride was stirred in a stainless steel turbomixer autoclave of 1 liter capacity, for 8 hours, during which the temperature was maintained at 21°–26° C. by means of a water bath. At the end of this time, the excess pressure was discharged, the autoclave was opened and the product was transferred to a large beaker. The product was then hydrolyzed with ice water and combined with the water, benzene and ether gleanings of the apparatus. The resulting mixture was filtered under suction and the insoluble solid after being washed with ether was allowed to dry, treated with hydrochloric acid which dissolved the inorganic material and permitted recovery of the benzene polymer. The total extract was water-washed, alkali-washed, dried over anhydrous potassium carbonate, filtered, concentrated over a steam bath and subjected to distillation. The desired product comprised a 25 mol percent yield of mixed amylbenzenes consisting of three isomers, namely, neopentylbenzene, t-pentylbenzene, and 2-phenyl-3-methylbutane.

EXAMPLE IV

The experiment of Example III was repeated except that air was pressed into the autoclave to an initial pressure of 82 atmospheres before stirring was begun. The reaction temperature was maintained at 24°–28° C. by means of the water-bath. Work-up of the product produced the amylbenzene mixture in 48 mol percent, practically double the yield obtained in Example III in the absence of added air.

EXAMPLE V

A mixture of 0.8 mol of benzene, 1.03 mol of isopentane and a catalyst complex consisting of 0.42 mol of cupric chloride and 0.16 mol of zinc chloride was placed in the glass liner of a rotating autoclave. The autoclave was then heated to a temperature of 200° C. and maintained in a range of from 200° to 300° C. for a period of 6 hours, the reaction being effected under an initial operating pressure of 30 atmospheres of nitrogen. At the end of this period, heating was discontinued and the autoclave allowed to return to room temperature. The liquid product was subjected to treatment in a manner similar to that hereinbefore set forth and the desired product comprising a mixture of isomeric amylbenzenes was obtained in a 3 mol percent yield. A repeat of the above experiment utilizing 0.8 mol of benzene, 1.0 mol of isopentane, a catalyst comprising a mixture of 0.43 mol of cupric chloride and 0.16 mol of zinc chloride was placed in the glass liner of a rotating autoclave. Following this, 15 atmospheres of air and 0.7 mol of anhydrous hydrogen chloride along with 15 atmospheres of nitrogen was pressed into the autoclave, the autoclave was then heated to a temperature of 200° C. and maintained in a range of 200° to 300° C. for a period of 5 hours, the maximum pressure at the reaction temperature reaching 142 atmospheres. At the end of the aforementioned 5 hour period, heating was discontinued and the autoclave allowed to return to room temperature, the final pressure at room temperature being 44 atmospheres. The excess pressure was discharged, the autoclave was opened and the reaction mixture subjected to treatment in a manner hereinbefore set forth. By thus carrying out the reaction in the presence of hydrogen chloride and air, it was found that the yield of amylbenzenes was increased to 14 mol percent.

EXAMPLE VI

In this example 0.5 mol of benzene is placed in the glass liner of a rotating autoclave along with a catalyst comprising a 1:1 mol ratio of aluminum chloride and cupric chloride. The autoclave is sealed and 0.3 mol of isobutane along with a sufficient amount of air to effect an initial operating pressure of 30 atmospheres are charged to the autoclave. The reactor is maintained at a temperature of about 28° C. by means of a water bath for a period of about 9 hours. At the end of this time, the excess pressure is discharged, the autoclave is opened and the mixture is recovered. The product is treated in a manner similar to that set forth in the above example whereby the product comprising isomeric butylbenzenes is recovered.

A repeat of this experiment in the absence of any added air utilizing only a catalyst system of aluminum chloride and cupric chloride will result in the obtention of a lower yield of the desired product than was obtained when effecting the reaction in the presence of air.

EXAMPLE VII

A mixture of 0.5 mol of benzene and 0.2 mol of branched-chain (hydrogenated propane tetramer) is placed in the glass liner of a rotating autoclave along with a catalyst complex consisting of a 1:1 mol ratio of aluminum chloride and cupric chloride. The autoclave is sealed and air is pressed in until an initial operating pressure of 30 atmospheres is reached. The autoclave is maintained at a temperature in a range of 24° to 28° C. for a period of 9 hours by means of a water bath. At the end of this time the excess pressure is discharged, the autoclave is opened and the reaction mixture is recovered. After treatment with ice water followed by ether extraction and distillation, the desired product comprising a mixture of dodecylbenzenes in a relatively high mol percent yield is recovered. When the alkylation of benzene with isododecane is effected in the absence of any added air, the yield of isomeric dodecylbenzenes will be greatly reduced.

EXAMPLE VIII

A mixture consisting of 0.5 mol of benzene and 0.6 mol of cyclohexane is placed in the glass liner of a rotating autoclave along with a catalyst consisting of a 1:1 mol ratio of zinc chloride and cupric chloride. The autoclave is sealed and air along with a minor amount of anhydrous hydrogen chloride is pressed in until an initial operating pressure of 50 atmospheres is reached. The autoclave and contents thereof are then heated to a temperature of 200° C. and maintained at 200° C. for a period of 4 hours. At the end of this 4 hour period, heating is discontinued, the autoclave is allowed to return to room temperature and the excess pressure is discharged, the reaction mixture is recovered, hydrolyzed with ice water, extracted with ether, washed with water, dried with anhydrous potassium carbonate and subjected to distillation. The desired product comprising cyclohexylbenzene is recovered in a relatively high yield.

A repeat of the experiment of the above paragraph in the absence of any added air and hydrogen chloride will result in the production of a much lower yield of cyclohexylbenzenes.

EXAMPLE IX

In this example 0.5 mol of benzene and 0.6 mol of 2,3-dimethylbutane are placed in the glass liner of a rotating autoclave along with a catalyst consisting of a equal molar mixture of aluminum chloride and cupric chloride. The liner is sealed into the autoclave and air pressed in until an initial operating pressure of 30 atmospheres is reached. The mixture is maintained at an operating temperature in the range of from 24° to 28° C. for a period of 8 hours, said temperature being maintained by means of a water bath. At the end of the aforementioned 8 hour period, the excess pressure is discharged and the autoclave is opened. The reaction mixture is treated with ice water followed by ether extraction and distillation, the desired product comprising two hexylbenzene isomers including 2 - phenyl - 2,3 - dimethylbutane and 2 - phenyl - 3,3-dimethylbutane being recovered in a substantial mol percent yield. When the experiment is repeated without the addition of an excess amount of air, it will be found that the yield of the desired hexylbenzene isomers will be greatly reduced.

I claim as my invention:

1. A process for the alkylation of an aromatic compound which comprises reacting said compound with a saturated hydrocarbon at alkylation conditions in the presence of an excess amount of an oxygen-containing gas and a catalyst consisting of a Friedel-Crafts metal halide and a higher valence halide of a metal capable of possessing at least two valences, and recovering the resultant alkylated aromatic compound.

2. The process as set forth in claim 1 in which said alkylation conditions include a temperature in the range of from about 0° to about 300° C. and a pressure in the range of from about atmospheric to about 200 atmospheres.

3. The process as set forth in claim 1 in which said oxygen-containing gas is air.

4. The process as set forth in claim 1 in which said oxygen-containisg gas is oxygen.

5. The process as set forth in claim 1 in which said Friedel-Crafts metal halide is aluminum chloride.

6. The process as set forth in claim 1 in which said Friedel-Crafts metal halide is zinc chloride.

7. The process as set forth in claim 1 in which said higher valence halide of a metal capable of possessing two valences is cupric chloride.

8. The process as set forth in claim 1 in which said aromatic compound is benzene, said alkylating agent is isopentane, and said resultant alkylated aromatic compound comprises a mixture of amylbenzenes.

9. The process as set forth in claim 1 in which said aromatic compound is benzene, said alkylating agent is isobutane, and said resultant alkylated aromatic compound comprises t-butylbenzenes.

10. The process as set forth in claim 1 in which said aromatic compound is benzene, said alkylating agent is branched-chain dodecane, and said resultant alkylated aromatic compound comprises a mixture of dodecylbenzenes.

11. The process as set forth in claim 1 in which said aromatic compound is benzene, said alkylating agent is cyclohexane, and the resultant alkylated aromatic compound comprises cyclohexylbenzene.

12. The process as set forth in claim 1 in which said aromatic compound is benzene, said alkylating agent is 2,3-dimethylbutane, and the resultant alkylated aromatic compound comprises a mixture of hexylbenzenes.

References Cited
UNITED STATES PATENTS

| | | | |
|---|---|---|---|
| 3,381,050 | 4/1968 | Bodre | 260—671 |
| 3,420,090 | 1/1969 | Schmerling | 260—671 |
| 3,446,866 | 5/1969 | Stern et al. | 260—671 |

CURTIS R. DAVIS, Primary Examiner

U.S. Cl. X.R.

260—671 C